(12) United States Patent
Bonnel et al.

(10) Patent No.: US 9,131,808 B2
(45) Date of Patent: Sep. 15, 2015

(54) RECHARGEABLE REMOVABLE HANDLE

(75) Inventors: Jocelyn Bonnel, Vions (FR); Jose Luis Herrada, Vienne (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 14/232,454

(22) PCT Filed: Jul. 5, 2012

(86) PCT No.: PCT/FR2012/051588
§ 371 (c)(1),
(2), (4) Date: Feb. 21, 2014

(87) PCT Pub. No.: WO2013/007932
PCT Pub. Date: Jan. 17, 2013

(65) Prior Publication Data
US 2014/0158698 A1    Jun. 12, 2014

(30) Foreign Application Priority Data

Jul. 13, 2011  (FR) ...................................... 11 56377

(51) Int. Cl.
*A47J 45/07*    (2006.01)
*A47J 27/00*    (2006.01)
(52) U.S. Cl.
CPC ................ *A47J 45/071* (2013.01); *A47J 27/00* (2013.01); *Y10T 16/4707* (2015.01)

(58) Field of Classification Search
USPC .......................... 220/573.1, 759; 16/422, 425
See application file for complete search history.

(56) References Cited

U.S. PATENT DOCUMENTS

| | | | | |
|---|---|---|---|---|
| 2,872,561 | A * | 2/1959 | Humphrey | 219/441 |
| 5,704,092 | A * | 1/1998 | Nicollet et al. | 16/425 |
| 7,409,765 | B2 * | 8/2008 | So | 30/123 |
| 2006/0196057 | A1 | 9/2006 | So | |
| 2006/0278095 | A1 * | 12/2006 | Saunders et al. | 99/348 |
| 2009/0212632 | A1 * | 8/2009 | Medugno | 307/66 |

FOREIGN PATENT DOCUMENTS

| | | |
|---|---|---|
| DE | 102004043579 | 5/2006 |
| EP | 1532910 | 5/2005 |

* cited by examiner

*Primary Examiner* — Anthony Stashick
*Assistant Examiner* — Raven Collins
(74) *Attorney, Agent, or Firm* — The Webb Law Firm (57) ABSTRACT

Provided is a removable handle (1) for a food cooking pot comprising a side wall, said handle comprising a grip body (7), attachment means (2) that can be connected to the cooking pot and disconnected therefrom, and an electrical and/or electromechanical (5) device housed in the grip body (7). The handle comprises a rechargeable electrical energy source supplying the electrical and/or electromechanical device (5) with power, and electromagnetic connection means (8) that are connected to the rechargeable electrical energy source and electrically connected to a power supply source separate from the handle so that the rechargeable electrical energy source (6) can be recharged.

13 Claims, 7 Drawing Sheets

RECHARGEABLE REMOVABLE HANDLE

CROSS-REFERENCE TO RELATED APPLICATIONS

This application is the United States national phase of International Application No. PCT/FR2012/051588 filed Jul. 5, 2012, and claims priority to French Patent Application No. 1156377 filed Jul. 13, 2011, the disclosures of which are hereby incorporated in their entirety by reference.

FIELD OF THE INVENTION

This invention concerns a removable handle for a cooking pot.

The removable handles are used to grip cooking pots such as casseroles or frying pans. The removable handles may be quickly attached to the cooking pot when in use and be removed from the cooking pot to make it easier to store.

DESCRIPTION OF RELATED ART

Document DE 102007054022 discloses a removable handle for a cooking pot which includes a side wall. The handle includes a grip body, a mechanism to attach it to and remove it from the cooking pot, a display and an energy source. More specifically, the attachment mechanism can be connected to an intermediate part attached to the pot. The pot includes a temperature sensor connected to a display by a wired connection. The pot includes electrical contacts which can be connected to and disconnected from the electrical contacts in the handle.

However, the removable handles of the prior art as described below present problems during cleaning. These handles are difficult to wash in water. The presence of a battery-powered energy source requires a housing in the grip body to hold the energy source and a removable cover to reseal the housing. This arrangement allows the cover to be removed to change the battery. However, water in the housing may result in short-circuits and damage the electronics.

EP-A-132910 also discloses a handle for a cooking pot which includes a side wall, wherein said handle includes:
a grip body, and
a mechanism to attach it to and disconnect it from the cooking pot.

The attachment mechanism includes a screw. This screw is mounted between the grip body (FIG. 2) and the attachment support (FIG. 3), which is part of the pot.

Figure 3:
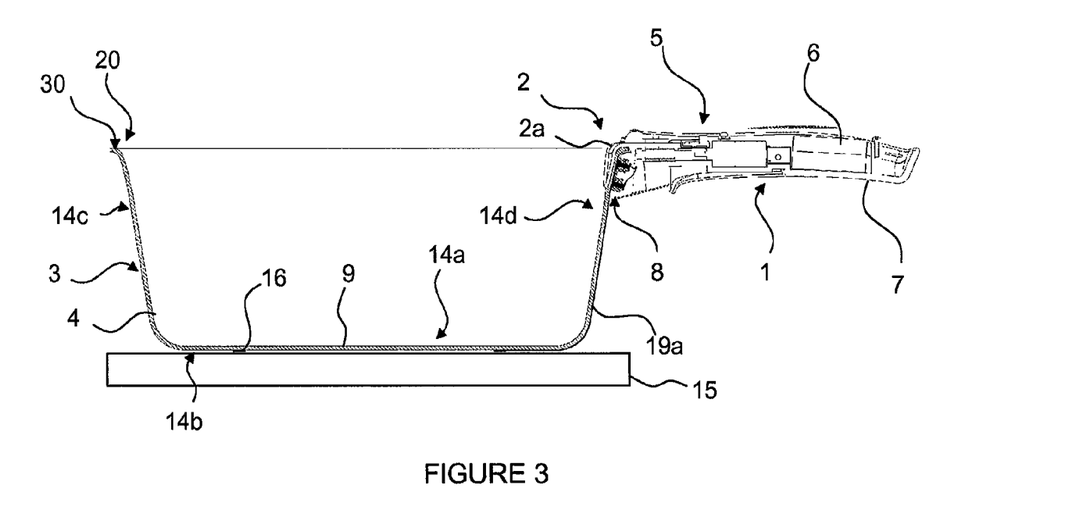
FIG. 3 shows a longitudinal cut-away of a cooking pot compatible with induction heating, in accordance with one implementation of the invention.

EP-A-132910 proposes an electromagnetic connection mechanism connected to a rechargeable electrical energy source and positions the electrical mechanism (FIGS. 5-9) in a connected attachment support (FIG. 3).

When the section of the handle, which is separable from the attachment support which is part of the pot, is actually disconnected from this support, there is no problem with respect to watertightness of the handle. However, the invention is designed to provide a removable handle which may be washed in water while avoiding the inconvenience in this area with the prior art.

In this regard, the problem of the invention related to the watertightness of the handle due to the rechargeable electrical energy source housed in the removable section of the handle does not exist in EP-A-132910 since unscrewing the aforementioned screw is not part of the normal operation of the item, in contrast to the invention with its removable handle.

In other words, the prior art provides that the electrical and/or electromechanical mechanism will be separate from [the removable section of] the handle.

SUMMARY OF THE INVENTION

To overcome the aforementioned difficulties, it is proposed here that the handle, which therefore is removable in addition to the grip body and said attachment mechanism, consist of:
an electrical and/or electromechanical mechanism housed in the grip body,
a rechargeable electrical energy source which provides electrical current to the electrical and/or electromechanical mechanism, and
an electromagnetic connection mechanism to connect the rechargeable electrical energy source to an electrical power source which is external to the handle to recharge the rechargeable electrical energy source.

"Electromagnetic connection mechanism" means a connection method which may be either electrical or magnetic.

Accordingly, the invention provides a removable handle which is more easily cleaned in water. The use of a rechargeable electrical energy source which does not have to be replaced simplifies the design of the handle while eliminating items which must constantly be removed to change the battery. This improves the watertightness of the handle.

BRIEF DESCRIPTION OF THE DRAWINGS

Other characteristics and benefits of the invention emerge clearly from the description provided below for illustrative purposes and is by no means limited, by reference to attached diagrams, in which.

DESCRIPTION OF THE INVENTION

Figure 8:
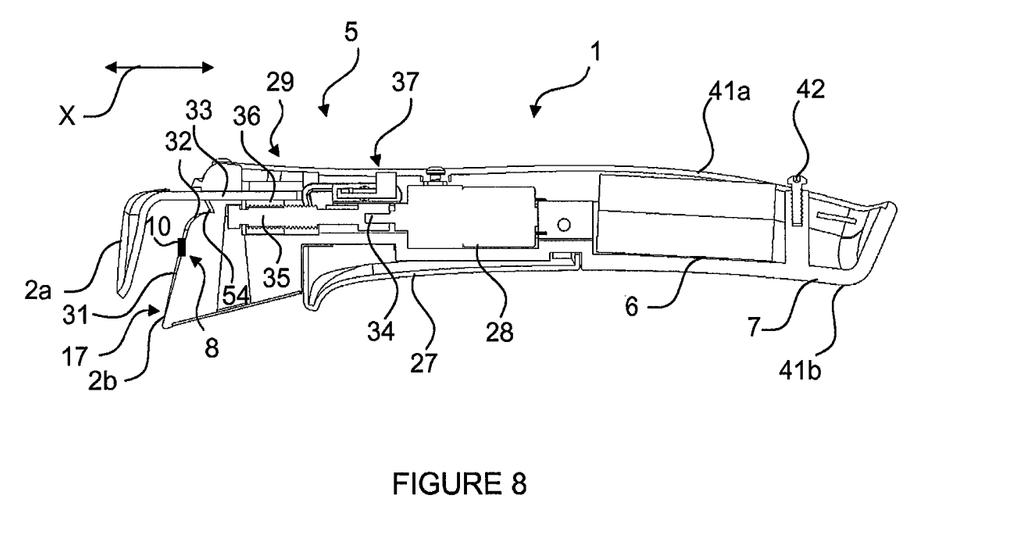
FIG. 8 shows a longitudinal cut-away of a removable handle with motorized pinchers in the open position, in one possible implementation.

As shown in FIG. 8, removable handle 1 includes grip body 7, attachment mechanism 2 which can be connected to and detached from cooking pot 3, an electrical and/or electromechanical mechanism 5 housed in the grip body 7, a rechargeable electrical energy source 6 which provides electrical current to the electrical and/or electromechanical mechanism 5, and electromagnetic connection mechanism 8 connected to rechargeable electrical energy source 6 and which can be electrically connected to external electrical power source 16 and the handle to recharge rechargeable electrical energy source 6. Attachment mechanism 2 is mounted on grip body 7. They preferably include, as shown, a section attached to it and a section which move relative to it, although it forms part of said body.

Figure 1:
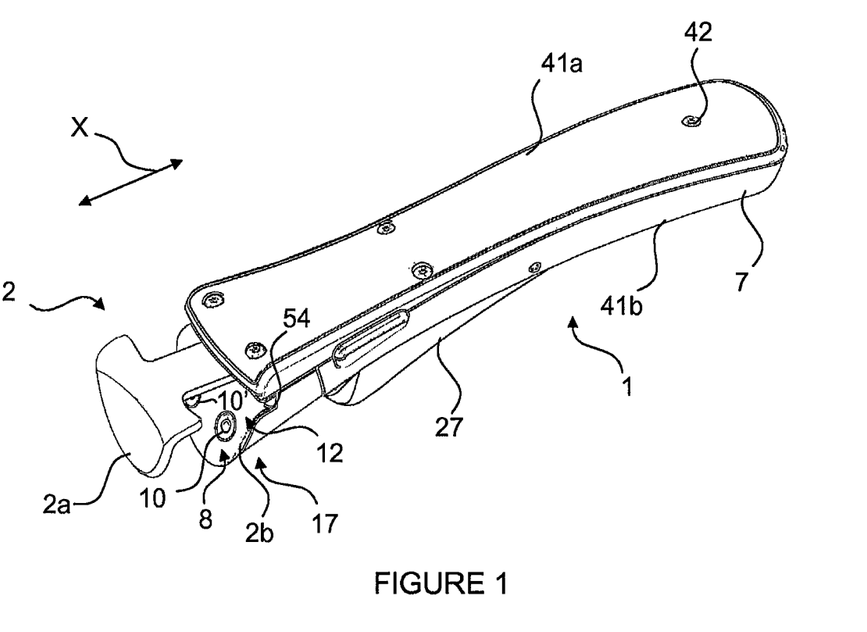
FIG. 1 shows a side view of a removable handle in the open position, in accordance with one implementation of the invention.

In one possible implementation, grip body 7 does not include a cover to access rechargeable electrical energy source 6. Grip body 7 includes two envelopes 41a and 41b attached to one another by attachment mechanism 42, which could be a screw, as shown in FIGS. 1 and 8. These envelopes seal off rechargeable electrical energy source 6 and have no opening or cover to remove it.

Grip body 7 may include watertightness means 43 to ensure that rechargeable electrical energy source 6 is watertight.

Watertightness means 43 may include a joint between two envelopes 41a and 41b (not shown).

Figure 11:
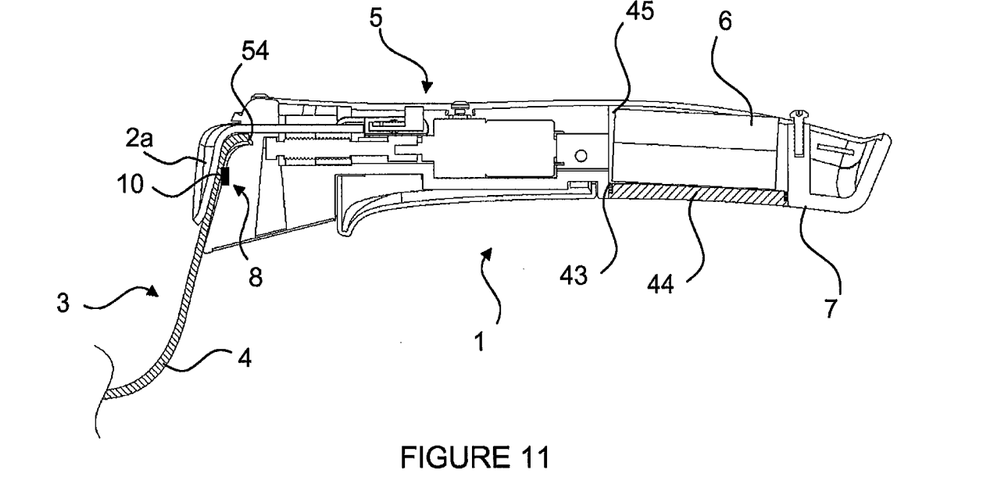
FIG. 11 shows a removable handle with a cover and a watertight joint.

In another possible implementation shown in FIG. 11, grip body 7 may include housing 45 to accept rechargeable electrical energy source 6. This housing 45 is watertight. It is closed by cover 44. Watertightness means 43 includes joint 43 located between cover 44 and the external peripheral edge which surrounds housing 45. Joint 43 may be a flat joint.

Figure 12:
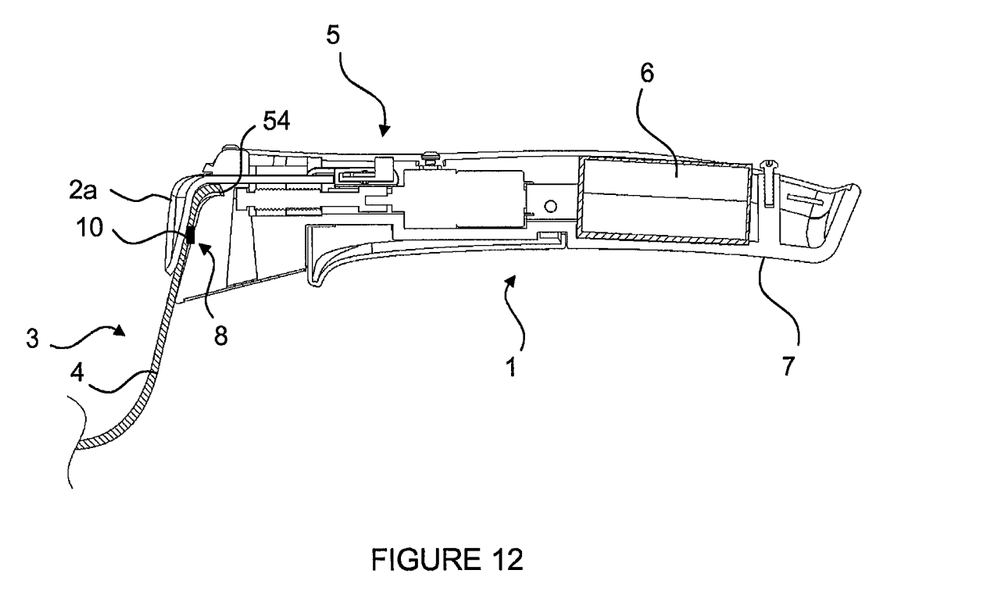
FIG. 12 shows a removable handle in which the rechargeable energy source is located within the material making up the grip body.

In another possible implementation shown in FIG. 12, rechargeable electrical energy source 6 is incorporated into the material which forms grip body 7 when it is molded.

In one possible implementation shown in FIG. 3, external electrical power source 16 consists of coil 16 which recovers electrical energy. Electromagnetic connection mechanism 8 of handle 1 includes at least one terminal 10 and 10' designed to come into contact with at least one additional terminal 11 and 11' designed to be connected to cooking pot 3 and connected to external electrical power source 16.

Figure 2:
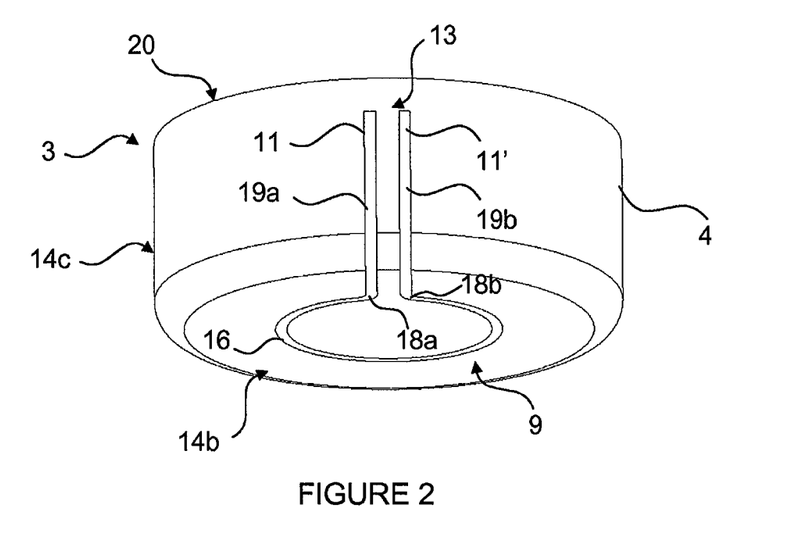
FIG. 2 shows a side view of a pot, in accordance with one implementation of the invention.
Figure 4:
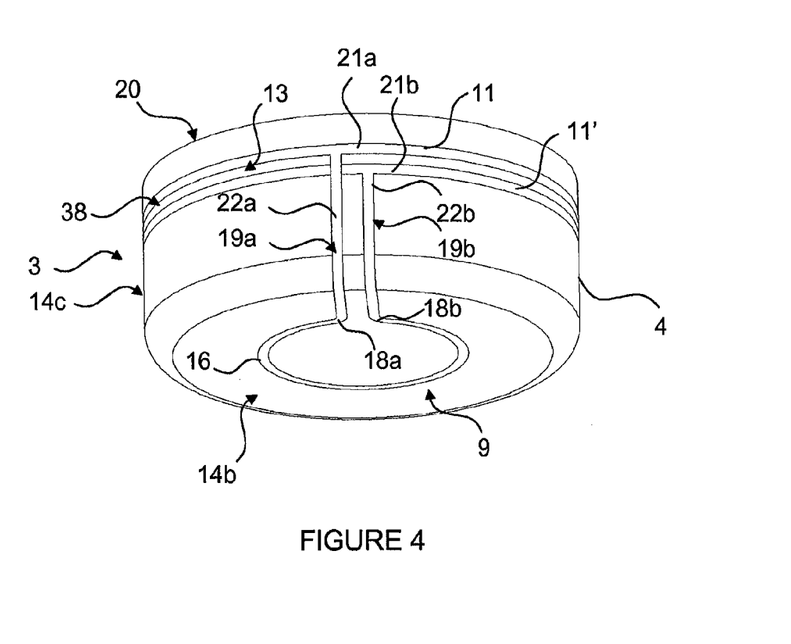
FIG. 4 shows a side view of a pot, in accordance with another implementation of the invention.

Pot 3, as shown in FIGS. 2 and 4, may include at least one electrical generating coil 16 using magnetic flow produced by an induction heating mechanism. This magnetic flow powers electrical and/or electromechanical mechanism 5 of handle 1. Coil 16 is located on external surface 14b of bottom 9 of pot 3, or preferably elsewhere, in particular, on internal surface 14a.

Preferably, coil 16 is silk screened to create a silkscreened path. The silkscreened path includes at least one electrical conductive material.

Advantageously, coil 16 is located on external surface 14b of bottom 9 of pot 4, to be near the surface of induction heating mechanism 15, with no magnetic screen between them (a PTFE or enamel layer may be used, neither of which forms such a screen).

Each connection terminal 10 and 10' can be electrically connected to at least one additional terminal 11 and 11' located on pot 3 which is connected to coil 16.

Attachment mechanism 2 includes contact surface 12 designed to come into contact with additional contact surface 13 on pot 3 to ensure that handle 1 is attached to pot 3. Contact surface 12 of attachment mechanism 2 has at least one terminal 10 and 10'. Attachment mechanism 2 includes two bits 2a and 2b which form a pincer and move relative to one another to attach handle 1. One of two bits 2a and 2b includes at least two terminals 10 and 10'.

Two bits 2a and 2b pinch wall 4 of pot 3 on which at least one additional terminal 11 and 11' is located. Each terminal 10 and 10' of handle 1 contacts this additional terminal 11 and 11'.

Figure 5:
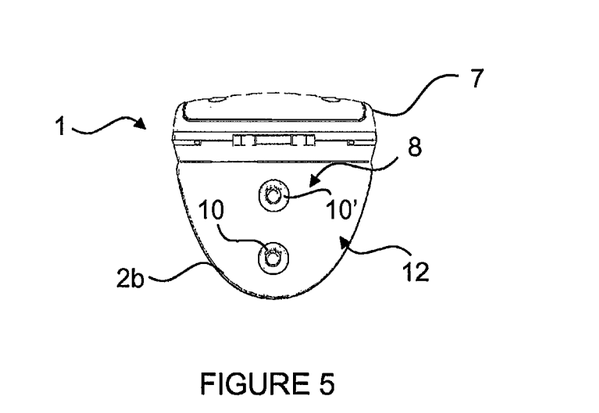
FIG. 5 shows a frontal view of a fixed bit of a handle, in accordance with one implementation of the invention.

The two bits 2a and 2b form a pincer which includes fixed bit 2b and mobile bit 2a relative to grip body 7. Terminals 10 and 10' may be located on fixed bit 2b, as shown in FIGS. 1, 3 and 5. Preferably, fixed bit 2b consists of front section 17 of grip body 7 which contacts external surface 14c of the wall of pot 3. In this implementation, coil 16 is located on external surface 14b of bottom 9 of pot 3.

In another possible implementation (not shown), terminals 10 and 10' may be located on the removable bit 2a. In this implementation, coil 16 is located on surface internal 14a of bottom 9 of pot 3.

Figure 14:
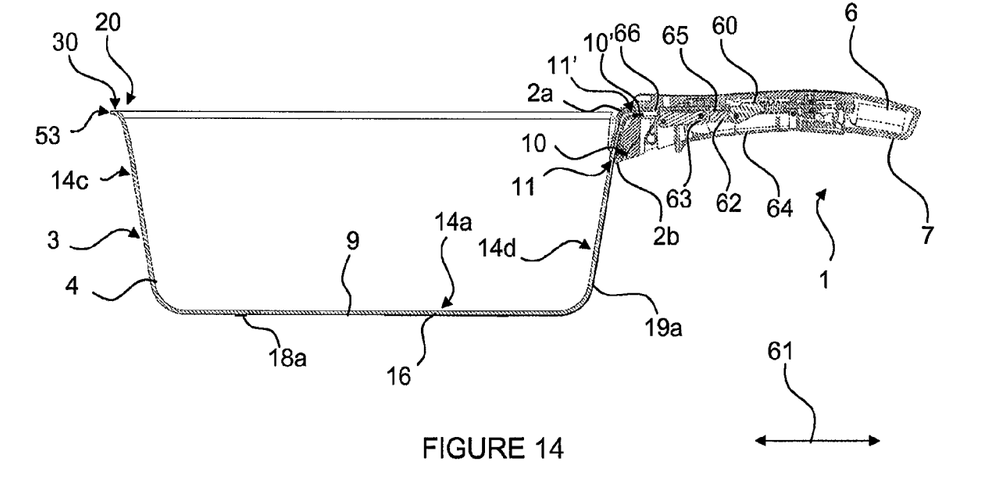
FIG. 14 shows a cut-away view of a handle with a terminal which can be connected outer edge of the pot.

In another possible implementation shown in FIG. 14, the handle has a mechanical attachment mechanism as, for example, described in application EP-1991098. Other mechanical attachment mechanisms may also be used.

To move mobile bit 2a with respect to fixed bit 2b located on the face, slide 60, which is mounted in longitudinal direction 61 compared to body 7, and first and second pivoting connecting rods 62 and 63, is used. The second connecting rod acts directly on mobile bit 2a. Maneuver button 64 mounted to shift on body 7 controls second connecting rod 63 and, through the articulated chain 60, 62 and 63 through lug 65 passes a light across rod 66 which ends on bit 2a. More details are available in EP 2007260.

In this example, fixed bit 2b includes two terminals 10 and 10', one lower terminal 10 of which is designed to come into contact with additional initial terminal 11 of the pot formed by electrical connection 19a located on side wall 4 of the pot and upper terminal 10' designed come into contact with extremity 53 of curved edge 30 of the pot which thus forms second additional terminal 11' of the pot. Coil 16 includes extremity 18a which comes into contact with a metallic layer which forms the pot. Accordingly, current may pass through this metallic layer to extremity 53 of curved edge 30.

Lower terminal 10 of the pot is located near the lower wall of grip body 7. Grip body 7 includes housing 54 located between contact surface 12 of fixed bit 2b and mobile bit 2a. Housing 54 is designed to accept extremity 53 of curved edge 30 of the pot. Upper terminal 10' is located in this housing 54 to contact extremity 53 of curved edge 30 of the pot.

This implementation, which is valid for a mechanical attachment mechanism, is also valid for an electromechanical attachment mechanism.

Rechargeable electrical energy source 6 may be a large battery or a super capacitor housed within grip body 7. It may be electrically connected both to coil 16 to recharge it with electrical energy and to electrical and/or electromechanical mechanism 5 to power it. For example, the large battery may provide 3 or 6 volt current and 780 milliamp/hour capacity.

In one possible implementation, coil 16 includes an open loop and two extremities, 18a and 18b, each connected to electrical connection 19a and 19b fixed on side wall 4 of pot 3. Electrical connection 19a and 19b reach the area near upper edge 20 of side wall 4 and form additional terminal 11 and 11' of pot 3 which may be connected to one of terminals 10 and 10' of handle 1.

In accordance with the implementation shown in FIG. 2, two electrical connections 19a and 19b are attached to external surface 14c of side wall 4 of pot 3. Two electrical connections 19a and 19b are basically rectilinear, perpendicular and adjacent to bottom 9 of pot 3. Handle 1, or more specifically, fixed bit 2b then includes two terminals 10 and 10' which can be connected to electrical connections 19a and 19b and be generally aligned parallel to bottom 9 when the handle is attached to the pot (FIG. 1). Therefore, the handle may be attached to the pot and its height may be adjusted slightly.

In one variation, two electrical connections 19a and 19b may be curved.

In accordance with the implementation shown in FIGS. 3 and 4, each electrical connection 19a and 19b consists of peripheral section 21a and 21b surrounding side wall 4 and intermediate section 22a and 22b which connects peripheral section 21a and 21b to one of extremities 18a and 18b of coil 16. Peripheral sections 21a and 21b are remote from one another. This distance is preferably as small as possible to not reduce maximum transmitted power. In this case, handle 1, or more specifically fixed bit 2b, includes two terminals 10 and 10' which can be connected to peripheral sections 21a and 21b, respectively, and aligned in non-parallel directions on bottom 9 of pot 3 (FIG. 5). In the example in FIG. 5, two terminals 10 and 10' are aligned vertically and perpendicularly on bottom 9 which is flat and horizontal. Peripheral sections 21a and 21b are circular. They may also be ovoid or have another shape.

Peripheral sections 21a and 21b are separated by space 38, which is preferably constant (FIG. 4). It may be variable. This distance is preferably the smallest possible to not reduce the maximum transmitted power.

Peripheral sections 21a and 21b are close to edge 20 of pot 4. It is therefore possible to position handle 1 anywhere along the periphery of side wall 4. No predetermined position exists. This is helpful when pot 3 becomes hot. It is not necessary to move or turn a badly positioned pot to attach the handle. The risk of a burn is avoided. Further, when a location on peripheral section 21a and 21b is dirty or damaged, it is possible to connect handle 1 at another location. In one variation, bottom 9 may include multiple coils 16, each consisting of two extremities 18a and 18b. For example, if bottom 9 includes two coils 16, the handle may include four terminals which can be connected to the four terminals located on the wall of the pot (not shown).

In one variation, when bottom 9 includes two coils 16, the handle may only include two terminals 10 and 10'. By positioning the handle differently relative to the pot, it is possible to connect the handle's terminals to either coil. The coils may be positioned in series or in parallel. In this case, electrical connections 19a and 19b and additional terminals 11 and 11' are located on the pot surface to form only two additional terminals 11 and 11'.

The number of loops or spires depends on the energy consumption of electrical and/or electromechanical mechanism 5 to be powered. For example, an LCD display screen requires 100 mW and a motor to drive mobile bit 2a of the fixation means requires 6 W. Therefore, a single loop to recover 20 W is necessary.

Figure 6:
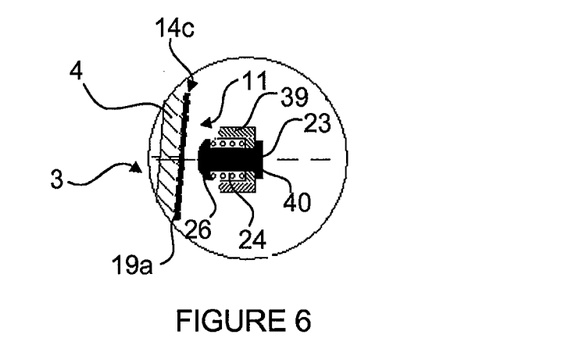
FIG. 6 shows a longitudinal cut-away in detail of an electrical connection plate, in accordance with one implementation of the invention.
Figure 7:
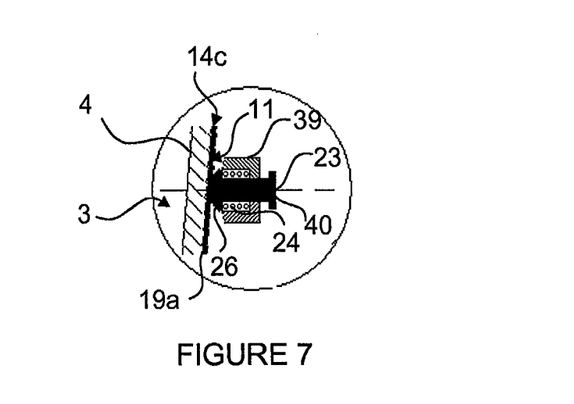
FIG. 7 shows a longitudinal cut-away in detail of this electrical connection plate connected to a terminal of the pot.

In one possible implementation, terminals 10 and 10' of handle 1 are electrical contact plates 23 pushed by elastic recall means 24, as shown in FIGS. 6 and 7. They limit contact resistance to less than 100 mOmhs and, preferably, to less than 10 mOmhs, thereby significantly improving yield.

Each electrical contact plate 23 is elongated in shape and has a circular cross section. Each electrical contact plate 23 has a cross section of at least 0.75 mm² to resist a current of at least 0.5 A, and preferably 3 A.

Each electrical contact plate 23 includes head 26 on one of its extremities which is designed come into contact with terminal 11 and 11' of pot 3 and, more specifically, with electrical connection 19a and 19b of pot 3. This head 26 is preferably rounded or convex.

Each electrical contact plate 23 is located in cylindrical support 39 and can move relative to support 39 between a deployed position, in which electrical contact plate 23 is not in contact with a terminal (FIG. 6), and a retracted position, in which electrical contact plate 23 is in contact with it and compressed against terminal 11 and 11' of pot 3 (FIG. 7).

Support 39 includes a housing in which spring 24 is located surrounding the central section of the plate. Spring 24 transfers a force to the exterior and against the lower section of head 26 of electrical contact plate 23. This spring 24 is pushed against the bottom of support 39. Electrical contact plate 23 includes foot 40 on its other extremity which is located on the outside of support 39. Foot 40 abuts external support surface 39 when plate 23 is in the deployed position (FIG. 6). Head 26 of the plate is also located on the outside of support 39. Head 26 abuts forward support surface 39 when plate 23 is in the contracted position (FIG. 7). Accordingly, plate 23 can move relative to support 39 when it is supported by it.

The assembly formed by plate 23, support 39 and spring 24 is supported on fixed bit 2b of the handle, i.e., by forward section 17 of grip body 7. Head 26 of the plate protrudes from surface 12 of fixed bit 2b when plate 23 is in the deployed position (FIG. 6).

When pot 3 is placed on an induction plate, the inductor of the induction plate generates a magnetic flow which is captured by pot 3, which then heats. A portion of the energy is recovered by coil 16 and used to power an electrical and/or electromechanical mechanism and/or rechargeable electrical energy source 6. Therefore, the current induced in this coil generally alternates with a frequency of approximately 25 KHz. A rectifier and a filtering means may be provided. A current regulator may also be provided. These items are housed in handle 1. A condenser may be provided to control the resonance system and maximize energy transfer.

Handle 1 may include command mechanism 27 to control operation and stop electrical and/or electromechanical mechanism 5, as shown in FIG. 8. This command mechanism may include motor 28 and trigger mechanism 29 driven by motor 28. Trigger mechanism 29 is designed to control mobile bit 2a.

In one variation, the attachment mechanism may be mechanical and include hooks which are part of handle 1 and designed to be inserted into the openings provided on the side wall of the pot. Other attachment mechanisms are also possible, e.g., a nut-bolt system. In this case, electrical and/or electromechanical mechanism 5 may include a display or a brush activated by motor 28, for example.

The attachment mechanism may be attached to side wall 4 of pot 3 or to another section of the pot such as a bracket which is part of the side wall.

Grip body 7 is elongated and extends in longitudinal direction (X).

In one variation, the two bits 2a and 2h which form pincer may move in opposite directions along longitudinal direction (X).

The handle is designed to be attached to and removed from pot 3, which is a cooking pot (casserole, frying pan, etc.) Lateral wall 4 may form curved edge 30 on its upper section, which forms a pouring edge. The example in FIGS. 3 and 8 shows side wall 4 which includes edge 30 curved toward the exterior. Fixed bit 2b is formed by grip body 7. More specifically, grip body 7 includes forward section 17 which has a contact surface which is designed to come into contact with external surface 14c of side wall 4 of pot 3. The contact surface of forward section 17 of the body is shaped to complement that of external surface 14c of side wall 4 and, more specifically, of the external surface of curved edge 30 of pot 3. More particularly, the contact surface of forward section 17 of grip body 7 has flat section 31 which runs along section curved 32 to the interior of grip body 7. Grip body 7 is preferably made of bakelite. When removable handle 1 is attached to pot 3, it is basically perpendicular to a plane tangent to side wall 4 of pot 3. Mobile bit 2a is shaped to complement that of internal surface 14d of the side wall and, more specifically, the surface internal of curved edge 30 of pot 3.

In one variation, two bits 2a and 2b, which form a pincer of handle 1, may be designed to be attached to a straight side wall without a curved edge, as shown in FIGS. 2 and 4.

Mobile bit 2a is extended by sliding arm 33 in a slide in grip body 7. Arm 33 extends in longitudinal direction (X). It is flat. In one variation, motor 28 may be replaced, for example, by an electromagnet, servomotor, or a pneumatic or electrical jack.

Electrical motor 28 is provided with electrical current by electrical energy storage mechanism 6 and/or coil 16. Electrical motor 28 has shaft 34 which rotates. Preferably, electrical motor 28 includes a reduction gear. The rotation speed of electrical motor 28 should be least 340 rotations per minute, and preferably 360 rotations per minute. The motor couple should be at least 80 mN/m and preferably 100 mN/m.

Trigger mechanism 29 includes initial transmission mechanism 35 designed to transfer the rotating motion of electrical motor 28 to second transmission mechanism 36, which is part of mobile bit 2a to move mobile bit 2a between the open and closed positions.

In one possible variation, initial transmission mechanism 35 includes threaded rod 35 which is rotated by electrical motor 28. Second transmission mechanism 36 includes mobile item 36 which has a threaded opening which engages threaded rod 35. The rotation of threaded rod 35 moves mobile item 36 the length of it and, as a result, moves mobile bit 2a between the open and closed position. Threaded rod 35 may be an infinite threaded screw. Threaded rod 35 is connected to shaft 34 of electrical motor 28. Threaded rod 35, shaft 34 and bit 2a and 2b, which form a mobile pincer, are generally aligned in a longitudinal direction (X). Threaded rod 35 rotates but does not move.

Threaded rod 35 and the threaded opening of mobile item 36 has a thread width of between 0.65 mm and 0.85 mm to block movement of mobile bit 2a when it is in closed position. Preferably, the thread is 0.75 mm wide.

For example, to provide 10 mm of travel of mobile bit 2a between the closed and open position to create a 10 mm of transverse movement of mobile item 36 along threaded rod 35, motor speed is 360 rotations per minute and the thread width of threaded rod 35 and the threaded opening of mobile item 36 is 0.75 mm. This configuration allows the movement of mobile bit 2a to be effectively blocked when it is in the closed position. Mobile item 36 may be, for example, a nut.

In one variation, trigger mechanism 29 may include a gear system (rack-and-pinion, conical wheels or cylinders), a bearing system (screw bearings), pulleys, belt, cog, chain, friction transmission or scotch yoke/cam system.

Mobile bit 2a may be made, for example, from stainless steel. Mobile bit 2a is extended by rectilinear arm 33 which forms a slide and extends to the interior of grip body 7. This arm 33 slides into a housing in grip body 7 between the closed and open position of mobile bit 2a. Second transmission mechanism 36 and, more specifically, mobile item 36 is part of this arm 33. In the examples shown, mobile item 36 is attached to arm 33.

Removable handle 1 may include switch 37 accessible from the exterior of grip body 7 to manually select the direction of rotation of electrical motor 28. An initial direction of rotation opens mobile bit 2a. A second direction of rotation closes mobile bit 2a. For example, when the direction of rotation to close mobile bit 2a is initially selected with switch 37, pushing command button 27 rotates electrical motor 28 in that direction of rotation and the closing direction of mobile bit 2a.

In one variation, removable handle 1 may include a sensor to detect the presence of handle 1 in contact with or very near pot 3. Activating the switch may automatically close mobile bit 2a without user intervention.

In one possible implementation, electrical and/or electromechanical mechanism 5 may include mechanisms other than the attachment mechanism. It may include a rotating brush connected to a shaft driven by the electromechanical mechanism or an agitator to, for example, blend, crush or mix the food. In this implementation, handle 1 includes an attachment mechanism which may be triggered manually or electromechanically.

In one possible implementation (not shown), the electromechanical mechanism may include a cam rotated by the threaded rod. The cam is part of the threaded rod and is located near the forward end of the threaded rod. The cam is housed in a housing in grip body 7. The housing opens to the exterior on the upper face of grip body 7. The cam is rotated by electrical motor 28 so it moves between a rest position in which the cam is housed in the housing and an activated position in which the cam protrudes from the upper face of handle 1. In the rest position, the main axis of the cam is basically parallel to the horizontal plane of handle 1. In the activated position, the main axis of the cam is basically perpendicular to the horizontal plane of handle 1 and oriented upward when handle 1 is attached to pot 3 when it is placed on a horizontal surface. In this activated position, the cam protrudes from the upper face of handle 1 and allows the edge of a cover placed on pot 3 to be raised more or less to control the rate of vapor flow when food is heated in pot 3.

In one variation, the electromechanical mechanism may include a cog rotated by the threaded rod which is itself driven by electrical motor 28 (not shown). The cog which is part of the threaded rod and is located near the front end to the threaded rod. The cog is housed in a housing in grip body 7. The housing opens to the exterior on the upper face of grip body 7. The cog is rotated by electrical motor 28 to drive a trammel located on the cover. The trammel rotates a paddle to blend the food (for example, purée, fried vegetables, or soup) in the bottom of pot 3.

In one variation, handle 1 includes a lifting mechanism to raise a cover placed on a pot (not shown).

Electrical and/or electromechanical mechanism 5 may include a display powered by electrical energy storage mechanism 6 and/or coil 16. This display may include a liquid crystal screen to, for example, display the remaining power in the electrical energy source, time, remaining cooking time or temperature of the pot. The liquid crystal screen is located on the upper face of handle 1.

Electrical and/or electromechanical mechanism 5 may include a measurement mechanism such as a temperature sensor or mechanism to weigh the food contents in pot 3, for example. The temperature or weight may be displayed on the liquid crystal screen. Handle 1 may include a clock and timer. The measurement mechanism is powered by electrical energy storage mechanism 6 and/or coil 16 and is connected to the electronic circuit.

Electrical and/or electromechanical mechanism 5 may include a wireless communication mechanism to receive and/or transmit information to a base station. The communication mechanism may include a radio transmitter and/or receiver powered by electrical energy storage mechanism 6 and/or coil 16 and is connected to the electronic circuit. For example, the base station may transmit cooking recipes to handle 1. These recipes can be displayed on the liquid crystal screen. Handle 1 may transmit signals with the pot temperature to the base station.

Electrical and/or electromechanical mechanism 5 may include a lighting mechanism, such as, for example, a diode, to light the food in pot 3. The lighting mechanism is located on the upper face and in front of handle 1. The lighting mechanism is powered by electrical energy storage mechanism 6 and/or coil 16.

The foregoing variants are possible for a handle attached permanently to pot 3 or to one which is removable.

An electronic card or circuit may control, for example, the rotation direction of the motor, detect the tightening of mobile bit 2a, display information on the status of handle 1 (open/closed, remaining power, specific problems, etc.), and the battery charge.

Electromagnetic connection mechanism 8 is accessible from the exterior of removable handle 1 to recharge rechargeable electrical energy source 6.

Figure 9:
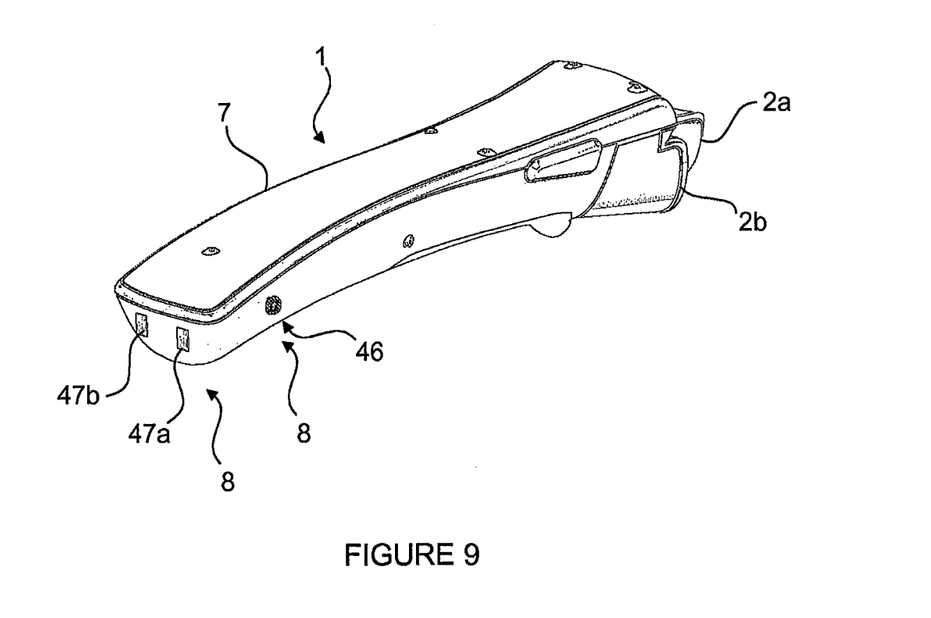
FIG. 9 shows a side view of a removable handle with contacts on its rear face and a socket.

Electromagnetic connection mechanism 8 may include "jack" type female socket 46, as shown in FIG. 9. This female socket 46 is located on grip body 7 of removable handle 1. It may be located on the side wall of grip body 7. Female socket 46 is may be connected to the sector using a power cord which includes a "jack" type male plug designed to be inserted into female socket 46 of removable handle 1.

Figure 13:
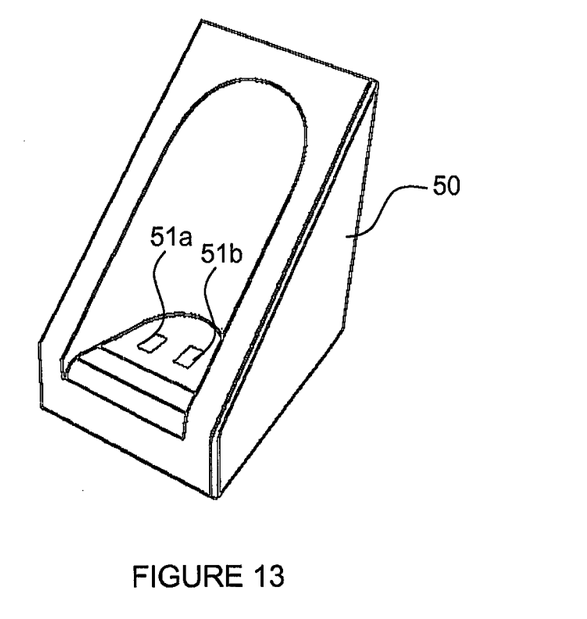
FIG. 13 shows a recharging stand with two electrical contacts.

As shown in FIG. 9, electromagnetic connection mechanism 8 may include two electrical connection terminals 47a and 47b which can be connected to and disconnected from two additional electrical connection terminals 51a and 51b on recharging stand 50 shown in FIG. 13, to recharge electrical energy source 6. Electrical connection terminals 47a and 47b are located on the back face of removable handle 1. Electrical connection terminals 47a and 47b may be connection plates or contacts. Removable handle 1 may be placed on recharging stand 50 in a basically vertical position or inclined from the vertical when recharging stand 50 is placed on a horizontal surface. Recharging stand 50 is connected to the electrical grid (230 V for example).

Figure 10:
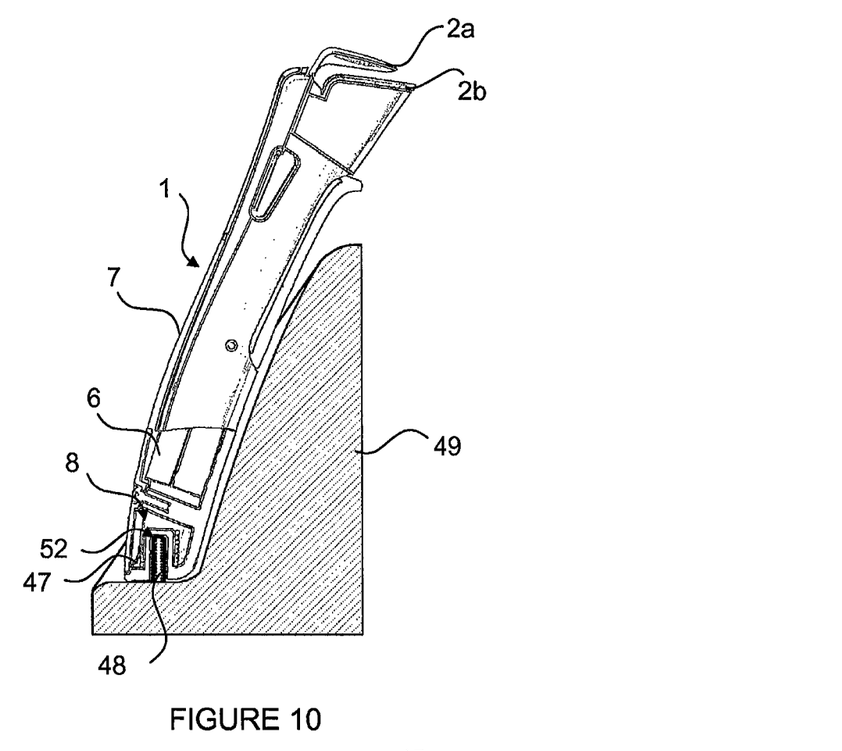
FIG. 10 shows the handle with a secondary induction coil in the recharging position on a recharging stand with a primary induction coil.

In one variation shown in FIG. 10, electromagnetic connection mechanism 8 may include secondary induction coil 47 connected to the rechargeable electrical energy source, as shown in FIG. 10. Secondary induction coil 47 is designed to accept the electromagnetic flow generated by primary induction coil 48 provided for on recharging stand 49.

Grip body 7 includes cavity 52 leading to its external surface. Cavity 52 is surrounded by secondary induction coil 47. Secondary induction coil 47 is housed inside grip body 7. Cavity 52 is designed to accept primary induction coil 48 of recharging stand 49. The transfer of energy from primary induction coil 48 to secondary induction coil 47 takes place without any contact. Cavity 52 forms a blind hole in grip body 7. It is bordered by a circular wall and a bottom. Secondary induction coil 47 surrounds external surface of the circular wall. These magnetic connection mechanisms ensure the watertightness of grip body 7 and form a watertight connection mechanism.

The invention claimed is:

1. Removable handle (1) of cooking pot (3) which includes side wall (4), where handle includes:
   grip body (7),
   attachment mechanism (2) which can be connected to and disconnected from cooking pot (3), which includes:
   electrical and/or electromechanical mechanism (5) housed in grip body (7),
   rechargeable electrical energy source (6) which provides electrical current to electrical and/or electromechanical mechanism (5), and
   electromagnetic connection mechanism (8) connected to rechargeable electrical energy source (6) which can be connected electromagnetically to external electrical power source (16) of the handle to recharge rechargeable electrical energy source (6).

2. Removable handle in accordance with claim 1, in which electromagnetic connection mechanism (8) includes at least one terminal (10 and 10') designed to come into contact with at least one additional terminal (11 and 11') on cooking pot (3) and to connect to external electrical power source (16).

3. Removable handle in accordance with claim 2, in which attachment mechanism (2) includes contact surface (12) which, when attached, comes into contact with additional contact surface (13) provided for on pot (3) to attach the handle to the pot, where said contact surface (12) of attachment mechanism (2) has at least one terminal (10 and 10').

4. Removable handle (1) in accordance with claim 1, in which attachment mechanism (2) includes two bits (2a and 2h) which form a mobile pincer relative to one another to attach removable handle (1), and electromagnetic connection mechanism (8) includes at least one terminal (10 and 10') located on one of the two bits (2a and 2b).

5. Removable handle (1) in accordance with claim 4, in which the two bits (2a and 2b) pinch side wall (4) of pot (3) on which at least one additional terminal (11 and 11') is located, and each terminal (10 and 10') of the handle is in contact with this additional terminal (11 and 11').

6. Removable handle (1) in accordance with claim 4, in which two bits (2a and 2b), which form a pincer including fixed bit (2b) and mobile bit (2a) relative to grip body (7), and terminals (10 and 10') are located on the fixed bit (2b).

7. Removable handle (1) in accordance with claim 6, in which fixed bit (2b) is formed by forward section (17) of grip body (7) which is in contact with external surface (14c) of the wall of pot (3).

8. Removable handle (1) in accordance with claim 2, in which terminals (10 and 10') of removable handle (1) are electrical contact surfaces (23) pushed by elastic recall means (24) to limit contact resistance to less than 100 mOmhs, and preferably to less than 10 mOmhs.

9. Removable handle (1) in accordance with claim 1, in which electrical and/or electromechanical mechanism (5) includes attachment mechanism (2) to create a motorized attachment mechanism.

10. Removable handle (1) in accordance with claim 1, in which grip body (7) includes watertightness means (43) to ensure the watertightness of electrical energy source rechargeable (6).

11. Removable handle (1) in accordance with claim 1, in which the electromagnetic connection mechanism includes secondary induction coil (47) designed to receive the electromagnetic flow generated by primary induction coil (48) on recharging stand (49).

12. Removable handle (1) in accordance with claim 11, in which grip body (7) includes cavity (52) bordered by a bottom and a side wall surrounded by secondary induction coil (47), and said cavity (52) is designed to receive primary induction coil (48) of recharging stand (49).

13. An assembly which includes cooking pot (3) and handle (1), in accordance with claim 1, attached to the pot by said
  attachment mechanism (2) and which can be removed from it.

\* \* \* \* \*

UNITED STATES PATENT AND TRADEMARK OFFICE
CERTIFICATE OF CORRECTION

| | | |
|---|---|---|
| PATENT NO. | : 9,131,808 B2 | Page 1 of 1 |
| APPLICATION NO. | : 14/232454 | |
| DATED | : September 15, 2015 | |
| INVENTOR(S) | : Jocelyn Bonnel et al. | |

It is certified that error appears in the above-identified patent and that said Letters Patent is hereby corrected as shown below:

In The Claims

Column 10, Line 33, Claim 4, delete "2h)" and insert -- 2b) --

Column 10, Line 53, Claim 8, delete "mOmhs," and insert -- mOhms, --

Column 10, Line 54, Claim 8, delete "mOmhs." and insert -- mOhms. --

Signed and Sealed this
Twenty-second Day of March, 2016

Michelle K. Lee
*Director of the United States Patent and Trademark Office*